United States Patent Office 3,391,903
Patented July 9, 1968

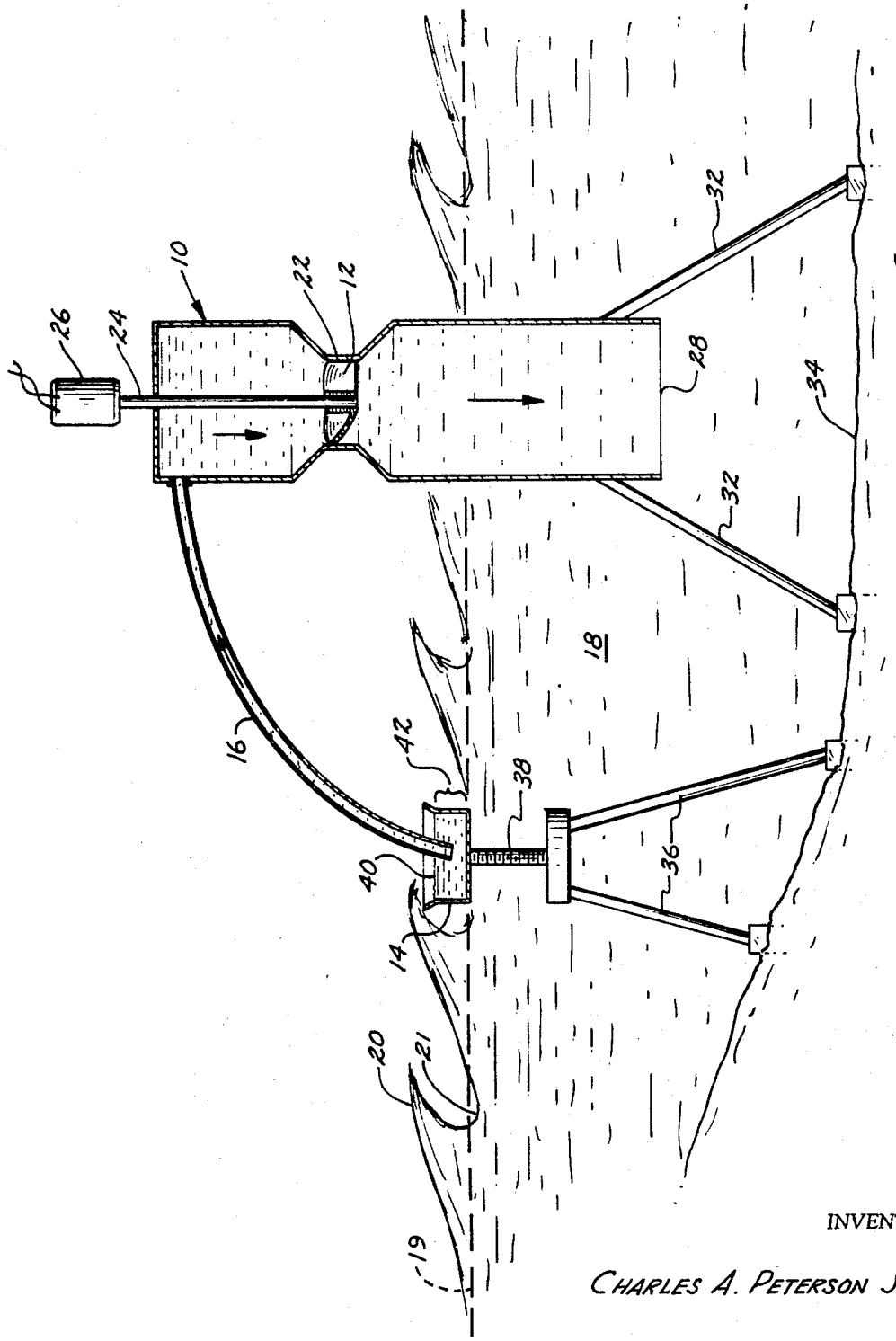

---

3,391,903
POWER GENERATING APPARATUS
Charles A. Peterson, Jr., 2121 Newport Place NW.,
Washington, D.C. 20037
Filed Aug. 4, 1967, Ser. No. 658,389
6 Claims. (Cl. 253—4)

ABSTRACT OF THE DISCLOSURE

This device utilizes the siphon principle to provoke the flow of water between reservoirs of dissimilar levels, the flow driving a turbine which motivates an electrical generator. A tower is mounted in a large body of water and is connected by a supply conduit to a reservoir containing a head of water. Means for harnessing the flow of water, such as a turbine, is mounted in the tower. The water siphoned out of the reservoir is constantly replenished by the waves in the large body of water splashing over the sides.

---

Background of the invention

*Field.*—This invention deals broadly with the generation of power and, more particularly, with the generation of power by harnessing the energy of the waves in a large body of water.

*Prior art.*—Over the years many attempts have been made to harness the energy available in the oceans in order to provide source of inexpensive power. Initially, rotating or reciprocating devices utilizing the tides or the action of the waves were tried, in order to harness power in a purely mechanical manner such as for lifting water for irrigation. Then came electrical power, but the widespread use of this source of power has not diminished the efforts of those who would still like to harness the energy available in the tide and wave motion of large bodies of water to turn electrical generators. The prior art is replete with hundreds of devices which use floats, paddle wheels, turbines and the like, with the ultimate aim of driving a rotating machine geared to an electrical generator. The major problem in all these machines is that the intermittence of the wave or tide motion must be converted into constant flow to drive the rotating machines. The up and down motion provided by reciprocating machines which harness the wave action has not been the answer because the wave action is not constantly of the necessary level. Attempts to harness the power of the tides has been more successful but it is still not possible to get a constant movement of water except by trapping the incoming tide and later releasing it, and this is possible only where the tide has a large rise and fall over a long run.

Summary of the invention

This device uses the siphon principle to provoke the flow of water between reservoirs of dissimilar levels, the flow driving a turbine which, in turn, motivates an electric generator or the like. The apparatus consists of a tower having a turbine mounted therein, a reservoir open only on the top, and a conduit extending from the top of the tower to the reservoir. The lower end of the tower is immersed in a major body of water such as an ocean, and the reservoir which contains the working head of water is positioned in that same body of water such that the waves in that body of water will constantly splash over the sides of the reservoir to refill it. The mean water level, or head, in the reservoir is higher than the mean water level in the body in which the tower is placed. With the entire arrangement charged with water, siphon action will induce water to flow from the closed reservoir to the top of the tower and then down through the tower, where it causes the turbine to turn. The energy available is the height of the head, the difference between the level of the water in the reservoir and the mean level in the major body of water into which the apparatus has been placed. The sides of the reservoir are of such height as to allow the waves in the large body of water to splash over into the reservoir, thus constantly replenishing and maintaining the head in the reservoir.

The drawing

The single figure is a diagrammatic side elevation of an embodiment of the instant invention.

Description

In its most basic form, the instant invention consists of four major parts, a tower 10 having a means for harnessing the flow of water such as a turbine 12 mounted therein, a reservoir 14, and a supply conduit 16. These components are arranged, as hereinafter described, in a body of water 18 having a mean water level 19 and a plurality of waves 20. Tower 10 can be of various designs, that shown having a constricted portion 22 in which is positioned an axial flow turbine 12, the constricted portion providing an increase in velocity to better drive the turbine. Turbine 12 is connected by means of a shaft 24 to an electrical generator 26. Tower 10 is so positioned that the opening in the bottom 28 is below the surface of the water to such an extent as to make it highly unlikely that the wave troughs 21 will ever fall below opening 28 and thus the head of water in tower 10 will not be lost. Tower 10 can be supported by means such as legs 32 which extend to the bottom 34 of the major body of water.

Reservoir 14 is closed except for the top, and provides a second body of water which has a mean water level 40 higher than that of the major body 18. Reservoir 14 is supported by a plurality of legs 36 which are fixed in the bottom 34 of the major body of water and, in order to provide compensation for such phenomena as the movement of the tides, can be mounted on a variable support such as a screw 38 so that it may be raised or lowered to compensate for the variance the tides will have in the mean water level 19. The kinetic energy available in this system is that provided by the difference between the water level 40 in the closed reservoir 14 and mean water level 19, this difference being hereinafter called the head 42.

Operation

This invention provides electrical power by means of a turbine driven by the flow of water induced through the apparatus described above by the principle of siphon action. Initially, tower 10 is completely filled to the top with water, as is supply conduit 16, and reservoir 14 is filled with water until the level reaches that indicated as 40. This charging can be accomplished by means such as drawing a vacuum on tower 10 through supply conduit 16 so that the water is drawn up through the tower and the supply conduit. Once the system has been charged, the difference in water levels will cause siphon action to draw water through conduit 16 and pass it down through tower 10 past the blades of turbine 12. This normal siphon action will continue as long as head 42 exists. Obviously, this siphon action can continue only as long as there is water in reservoir 14. In order to resupply the water in reservoir 14, it is designed so that its sides are of less height than the waves 20. As each wave passes reservoir 14 it splashes over the sides thereof and constantly replenishes the water in the reservoir, thus insuring the maintenance of head 42.

As the water flows down through column 10 its velocity increases at constriction 22 and drives an axial flow turbine 12 which, in turn, motivates an electrical generator 26. Once the system has been charged, the operation of the pumping system is constant and self-sustaining, the energy input being provided by the action of the waves 20. In order to insure that the reservoir 14 is positioned for optimum use of the wave energy, it may be adjusted up and down by means such as a screw drive 38, which could be used for compensating for the rise and fall of the tides. In this regard, it is important to understand that the bottom opening 28 of tower 10 must always be beneath the surface of the water, and this must be provided for in the initial design. Also important to the sustaining operation of the system is the volume of reservoir 14, which must be related to the average height and frequency of the waves, in order to insure that a sufficient amount of water is always available.

Obviously, the concept of this invention set forth herewith can be manifested in many different embodiments other than the one shown in the instant application. Many modifications will be obvious to one skilled in the art and, therefore, it is apparent that within the scope of the appended claims, the invention may be practiced otherwise than as specifically described.

I claim:
1. A power generating apparatus utilizing the energy of the waves of a large body of water comprising
   a generally vertically oriented tower having a closed upper end and an open lower end, said lower end being positioned beneath the water level of said large body of water,
   a reservoir positioned on the surface of said large body of water in such a manner as to allow a head of water higher than the water level of said large body of water to be created in said reservoir, said reservoir being closed except for the top and having sides of such height as to allow the waves present in said large body of water to splash over said sides into said reservoir to constantly replenish and maintain said head of water therein,
   a conduit interposed between and in fluid communication with the upper portion of said tower and said head of water in said reservoir, and
   means in said tower for harnessing the flow of water through said tower,
   whereby when said tower, said conduit, and said reservoir are charged with water, siphon action will cause water to flow from said reservoir to and through said tower, the head of water in said reservoir being maintained by the splashing of the waves into said reservoir.

2. The apparatus of claim 1 wherein said means for harnessing the flow of water through said tower is a turbine.

3. The apparatus of claim 2 wherein said tower comprises a constricted portion, said turbine being mounted in said constricted portion.

4. The apparatus of claim 1 further including vertically adjustable means supporting said reservoir,
   whereby the optimum position of said reservoir with respect to said water level of said large body of water can be maintained notwithstanding changes in the height of said water level.

5. The apparatus of claim 4 wherein said means for harnessing the flow of water through said tower is a turbine.

6. The apparatus of claim 5 wherein said tower comprises a constricted portion, said turbine being mounted in said constricted portion.

References Cited
UNITED STATES PATENTS

| | | | |
|---|---|---|---|
| 537,000 | 4/1895 | Blanks | 61—20 |
| 1,099,085 | 6/1914 | Hale | 61—20 |
| 2,432,510 | 12/1947 | Danel | 61—20 |

MARTIN P. SCHWADRON, *Primary Examiner.*

C. B. DORITY, *Assistant Examiner.*